United States Patent
Lanzone et al.

(10) Patent No.: US 10,284,347 B2
(45) Date of Patent: May 7, 2019

(54) IN BAND CONTROL CHANNELS OF A COMMUNICATION NETWORK

(71) Applicant: Telefonaktiebolaget LM Ericsson (publ), Stockholm (SE)

(72) Inventors: Sergio Lanzone, Genoa (IT); Daniele Ceccarelli, Stockholm (SE); Manuela Scarella, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 440 days.

(21) Appl. No.: 14/917,226

(22) PCT Filed: Sep. 20, 2013

(86) PCT No.: PCT/EP2013/069571
§ 371 (c)(1),
(2) Date: Mar. 7, 2016

(87) PCT Pub. No.: WO2015/039695
PCT Pub. Date: Mar. 26, 2015

(65) Prior Publication Data
US 2016/0218839 A1   Jul. 28, 2016

(51) Int. Cl.
| | |
|---|---|
| H04L 5/00 | (2006.01) |
| H04L 12/24 | (2006.01) |
| H04L 12/26 | (2006.01) |
| H04J 3/16 | (2006.01) |

(52) U.S. Cl.
CPC ........... *H04L 5/005* (2013.01); *H04J 3/1652* (2013.01); *H04L 41/00* (2013.01); *H04L 41/04* (2013.01); *H04L 43/10* (2013.01); *H04L 43/0811* (2013.01)

(58) Field of Classification Search
CPC ......... H04L 5/005; H04L 41/00; H04L 41/04; H04L 43/10; H04L 43/0811; H04J 3/1652
See application file for complete search history.

(56) References Cited

U.S. PATENT DOCUMENTS

| | | | |
|---|---|---|---|
| 6,625,147 B1 * | 9/2003 | Yokoyama | H04L 41/00 370/389 |
| 7,278,081 B1 | 10/2007 | Blair et al. | |
| 2002/0097954 A1 | 7/2002 | Maeno | |
| 2003/0035648 A1 * | 2/2003 | Lopez-Estrada | G11B 27/034 386/241 |
| 2006/0198634 A1 * | 9/2006 | Ofalt | H04B 10/077 398/16 |
| 2007/0201383 A1 | 8/2007 | Ong et al. | |
| 2008/0025722 A1 | 1/2008 | Gerstel | |
| 2009/0293114 A1 * | 11/2009 | Mustafa | H04L 63/0227 726/13 |

(Continued)

OTHER PUBLICATIONS

Ji et al., "A Novel Covert Channel Based on Length of Messages", 2009 International Symposium on Information Engineering and Electronic Commerce, p. 551-554.*

(Continued)

*Primary Examiner* — Christopher M Crutchfield
*Assistant Examiner* — Tito Q Pham
(74) *Attorney, Agent, or Firm* — Leffler Intellectual Property Law, PLLC

(57) ABSTRACT

An in band control channel is created between nodes of a communication network in which the nodes have limited capability of inspecting the payload of packets to be transported over the network. The in band control channel is created by transmitting a plurality of dummy packets, each dummy packet having one of a plurality of different predetermined lengths, the sequence of dummy packets defining a code corresponding to at least one control command.

20 Claims, 6 Drawing Sheets

(56) References Cited

U.S. PATENT DOCUMENTS

| | | | | |
|---|---|---|---|---|
| 2012/0281715 A1* | 11/2012 | Shojania | ............ | H04L 12/2671 370/468 |
| 2014/0185501 A1* | 7/2014 | Park | .................. | H04W 52/0238 370/311 |
| 2014/0192821 A1* | 7/2014 | Hershko | ................. | H04L 47/34 370/465 |
| 2014/0321285 A1* | 10/2014 | Chew | ...................... | H04L 47/24 370/236 |
| 2015/0003259 A1 | 1/2015 | Gao | | |
| 2016/0045169 A1* | 2/2016 | Mazar | .................. | A61B 5/0031 600/301 |

OTHER PUBLICATIONS

Goudar et al., "Packet Length Based Steganography Detection in Transport Layer" Dec. 2012, International Journal of Scientific and Research Publications, vol. 2, Issue 12, pp. 1-5 (Year: 2012).*

J. Lang, Network Working Group, Request for Comments: 4204, Category: Standards Track, Link Management Protocol (LMP), Sonos, Inc., Oct. 2005, 76 pages.

PCT International Search Report, dated Jun. 23, 2014, in connection with International Application No. PCT/EP2013/069571, all pages.

ITU-T G.709/Y.1331 (Feb. 2012), Series G: Transmission Systems and Media, Digital Systems and Networks, Digital terminal equipments—General, Series Y: Global Information Infrastructure, Internet Protocol Aspects and Next-Generation Networks, Internet protocol aspects—Transport, Interfaces for the optical transport network, 238 pages.

ITU-T G.798 (Dec. 2012), Series G: Transmission Systems and Media, Digital Systems and Networks, Digital terminal equipments—Other terminal equipment, Characteristics of optical transport network hierarchy equipment functional blocks, 390 pages.

Farzaneh Pakzad et al., "Efficient Topology Discovery in Software Defined Networks", 2014 8th International Conference on Signal Processing and Communication Systems (ICSPCS), IEEE, Dec. 15, 2014, pp. 1-8.

* cited by examiner

IN BAND CONTROL CHANNELS OF A COMMUNICATION NETWORK

TECHNICAL FIELD

The invention relates to a communication network, and in particular to creating an in band control channel between nodes of the communication network.

BACKGROUND

For some communication networks during the transfer of packets between a plurality of nodes of the network, the receiving node does not have the capability to look at the payload of a received packet, for example, an optical transport network (OTN). The traffic generated by the routers of such networks, typically 10 Gigabit Ethernet and 100 Gigabit Ethernet, is transported over the OTN via transponders. The transponders encapsulates the data into Optical Channel Data Unit-k (ODUk) containers for transporting the packets, for example 10 GE is encapsulated to ODU2e container and 100 GE is encapsulated to ODU4 container suitable for the transport over Dense Wavelength-Division Multiplexing (DWDM) links.

The optical nodes of the OTN comprise optical cards that are not able to look at the payload received on their client interfaces for example client interfaces Synchronous Digital Hierarchy (SDH), Constant Bit Rate (CBR), Storage Area Network (SAN), for example when the transponder client is packet like layer 3 Internet Protocol (IP) or layer 2 Ethernet.

Furthermore such communication networks are required to provide communication control between the nodes (e.g. router and optical nodes). This may be achieved by means of out of band control channels or in band control channels. Out of band control channels, however, are extremely complicated from an operational and maintenance view point and many changes in the router behavior is required. Moreover it is not suitable for operations related to the physical link, for example auto-discovery, link failure etc. In band control channels are difficult to implement in a communication system in which the receiving node has limited packet inspection capability.

An example of an optical transport system in which a router directly communicates with an optical node is shown in FIG. 1. The optical transport system comprises a router 101 comprising a data card 105 in communication with a transponder 107 of an optical node 103. Data packets received at the optical node 103 are passed through a passive filter 109 to one of plurality of Wavelength Selective Switch (WSS) units 111_1 to 111_n for output across the network via corresponding optical amplifiers 113_1 to 113_n. The direct communication between the router 101 and optical node 103 is activated using any L2 and L3 protocols having no split between the control plane and the forward plane. The optical node 103 provides only transparent mapping of packets onto the OTN frame, thus the optical node has no packet processing or peer interface detection capability.

As a result, the only action allowed to the transponder 107 of the node 103 is to inject a maintenance signal into the container of a packet instead of the client as a consequence of a fail condition (e.g. Loss of Signal (LOS) of the Ethernet client detected by the transponder). The rules for mapping the packets onto the network and the action to inject a maintenance signal are specified by ITU-T G.709 and G.798. Considering the above limited capability in inspecting packets, such transponders are not able to decode in-band control-plane packets. Therefore it is not possible to have a communication between the router and the transponder unless via network management system and controller units. This is a limitation because many control plane protocols use in-band packets to connect nodes, cards, etc.

SUMMARY

The invention seeks to provide in band control channels for nodes of a communication network in which the nodes have limited capability to inspect the payload of the packets being transported by the network.

According to an aspect of the present invention, there is provided a method of creating an in band control channel between nodes of a communication network by transmitting a plurality of dummy packets. Each dummy packet has one of a plurality of different predetermined lengths, and the sequence of dummy packets defines a code corresponding to at least one control command.

According to another aspect of the present invention, there is provided a router node for a communication network. The router node comprises a transmitter. The transmitter is configured to transmit a plurality of dummy packets to at least one node. Each dummy packet has one of a plurality of different predetermined lengths and the sequence of dummy packets defines a code corresponding to at least one control command for the at least one node.

According to yet another aspect of the present invention there is provided a node for a communication network. The node has two modes of operation. In the first mode of operation the node is configured to receive data plane traffic and in the second mode of operation the node is configured to receive control plane traffic. The node comprises a receiver configured to receive data packets from a router node in the first mode of operation, and is configured to receive a sequence of a plurality of dummy packets in the second mode of operation. Each dummy packet has one of a plurality of different predetermined lengths. The sequence of dummy packets defines a code corresponding to at least one control command. The node further comprises a decoder configured to check the length of each received dummy packet and decode at least one control command based on the sequence of lengths of the received dummy packets in the second mode of operation and a controller configured to control operation of the node in accordance with the at least one decoded control command.

Since the receiving node has limited capability of inspecting the payload of the received packet, the receiving node inspects (checks) the length of a sequence of dummy packets. The length of the dummy packets within the sequence varies to define a code for control commands. As the control commands are defined by the lengths of dummy packets in the sequence, an in band control channel is created as the commands can be derived without requiring inspection of the payload of the packet.

In an embodiment, a first predefined sequence of dummy packets is transmitted to define initialisation of the control channel and wherein the step of transmitting a plurality of dummy packets succeeds transmitting the first predefined sequence of dummy packets. The first predefined sequence may comprise a first predetermined number of substantially equal length dummy packets. Alternatively the first predefined sequence comprises a first predetermined number of pair of dummy packets, one of each pair of dummy packets comprising a dummy packet having a minimum length and the other of each pair of dummy packets comprising a dummy packet having a maximum length.

In a further embodiment, upon receiving the first predefined sequence of dummy packets at a node, receiving the plurality of transmitted dummy packets, checking the length of each received dummy packet and decoding at least one control command based on the sequence of lengths of the received dummy packets.

The step of transmitting a first predefined sequence of dummy packets may be repeated after the transmission of a predetermined of dummy packets increasing the robustness of the protocol, as the optical node understands that the in band control channel is still open.

Further the transmission of the first predefined sequence of dummy packets may be returned to confirm that the optical node is in the second mode of operation.

In an embodiment, a second, predefined sequence of packets to define the termination of the control channel is transmitted. The step of transmitting a plurality of dummy packets may proceed transmitting the second predefined sequence of dummy packets. The second predefined sequences may comprise a second predetermined number of substantially equal length dummy packets.

The step of transmitting the plurality of dummy packets may be repeated periodically until transmission of the second, predefined sequence of packets. The second, predefined sequence of packets may be transmitted after a predetermined time interval has elapsed.

The plurality of different predetermined lengths may comprise a maximum length and a minimum length.

The coding of the control commands can be simplified to being defined by 2 different lengths so that use of existing coding can be utilised, such as, for example Morse code.

BRIEF DESCRIPTION OF THE DRAWINGS

The invention will now be described, by way of example only, with reference to the following drawings, in which.

DETAILED DESCRIPTION

Figure 1:
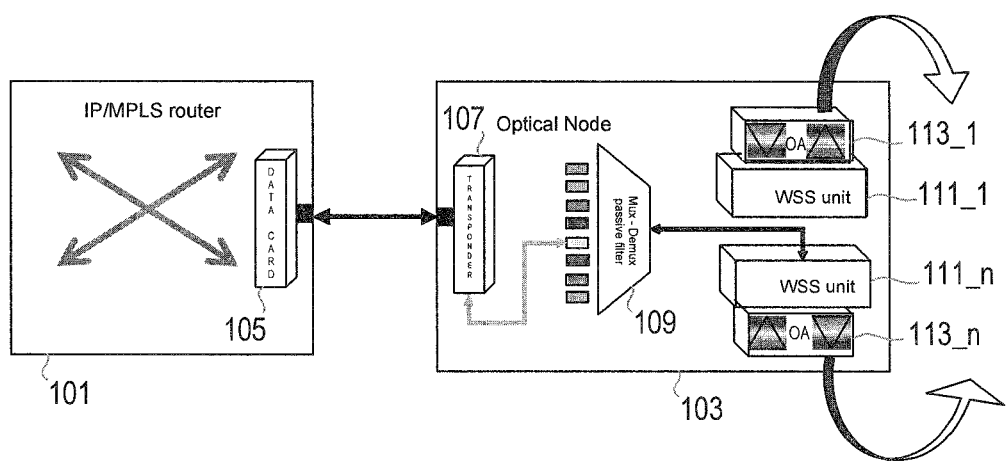
FIG. 1 is a simplified schematic of an example of an optical communications network.
Figure 2:
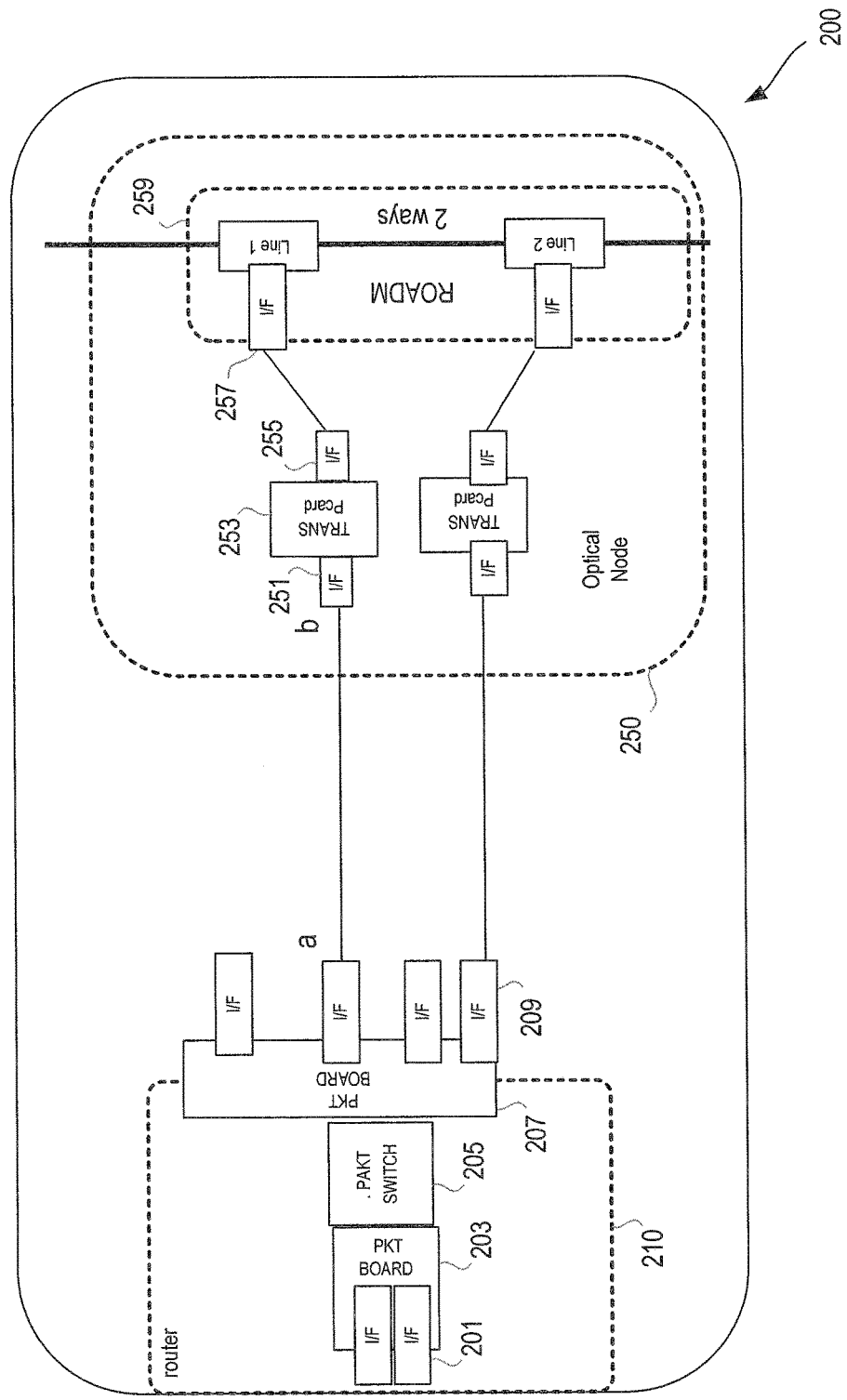
FIG. 2 is a more detailed schematic of the optical communications network of FIG. 1.

In an embodiment, an in band control channel is created between the nodes of a communication network in which the nodes have limited capability of inspecting the payload of packets received at the nodes. In particular, but not exclusively, an optical communication network, for example, as illustrated in FIGS. 1 and 2. Although the present invention is described herein with reference to an optical communication network comprising a router and optical node as shown in FIGS. 1 and 2, it can be appreciated that the present invention is equally applicable to any other communication network for transporting packets over a plurality of nodes.

As shown in more detail in FIG. 2, the network 200 comprises, at least a router node 210 and an optical node 250. The router node comprises input interfaces 201 within an input packet board 203 connected to a packet switch 205. The packet switch 205 is connected to an output packet board 207 which comprises a plurality of output interfaces 209. In the example of FIG. 2, point a of the router node 210 is in direct communication with a point b of the optical node 250, that is at least one the plurality of output interfaces is in direct communication with at least input interface 251 of the optical node 250. The input interface 251 forms part of a transponder processing card 253. An output interface 255 of each transponder processing card 253 is connected to corresponding input interface 257 of a reconfigurable optical add-drop multiplexer (ROADM) output 259.

Figure 3:
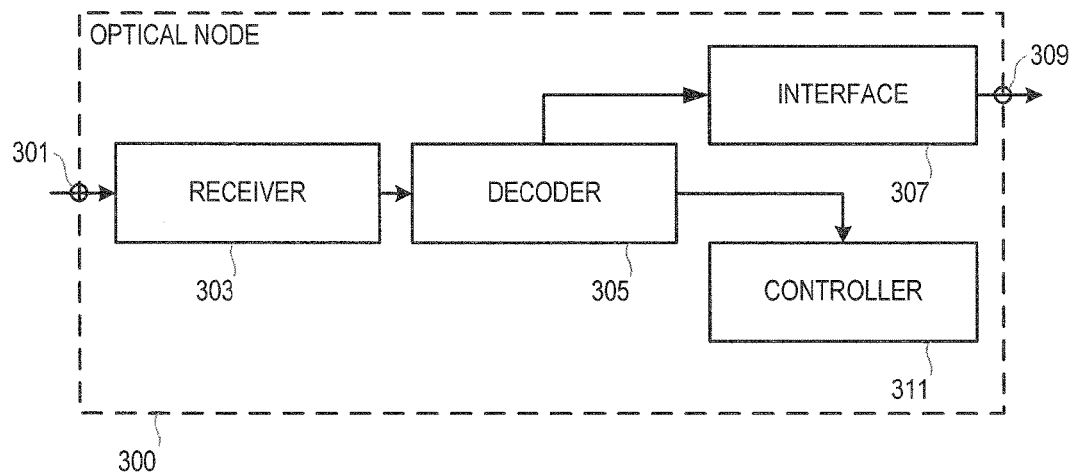
FIG. 3 is a simplified schematic of an embodiment of an optical node of the optical communications network of FIG. 1.

The optical node 250 is adapted as shown by the optical node 300 in FIG. 3. The input interface 251 is adapted to comprise the receiver 303 connected to an input terminal 301. The output interface 255 is adapted to comprise the interface 307, connected to an output terminal 309 and the transponder processing card 253 is adapted to include the decoder 305 and the controller 311.

The optical node 300 is configured to have two modes of operation. The first mode of operation comprises receiving data-plane traffic and the second mode of operation comprises receiving control-plane traffic. The receiver 303 is configured to receive data packets from a router node in the first mode of operation, and is configured to receive a plurality of dummy packets, each dummy packet having one of a plurality of different predetermined lengths, the sequence of dummy packets defining a code corresponding to at least one control command in the second mode of operation. The decoder 305 configured to check the length of each received dummy packet and decode at least one control command based on the sequence of lengths of the received dummy packets in the second mode of operation. The controller 311 configured to control operation of the optical node 300 in accordance with the at least one decoded control command.

The router node 210 is also adapted such that the transmitter 207 is configured to transmit a plurality of dummy packets to the at least one optical node 300, each dummy packet having one of a plurality of different predetermined lengths, the sequence of dummy packets defining a code corresponding to at least one control command for the at least one optical node 300. The router node 210 is further adapted to remove the packet switch 205.

In this way, an in band control channel is created for a communication network in which the nodes have limited capability of inspecting the payload of received packets. The communication between router nodes and optical nodes is therefore set up mixing control-plane into the data-plane relying on the present optical node's capability (i.e. the optical node is not able to inspect the packets but just to recognize the length of each received packets).

Figure 4A:
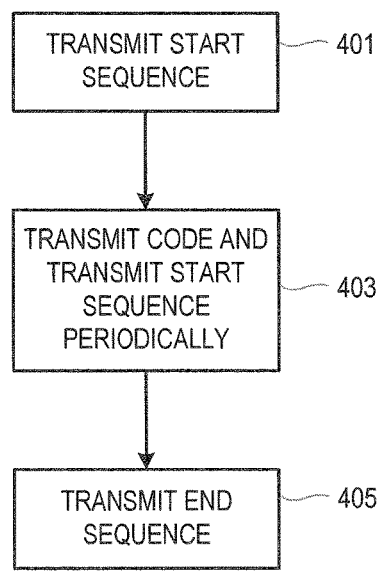
FIG. 4a is a flowchart of the method of creating a control channel of an embodiment of the present invention.
Figure 4B:
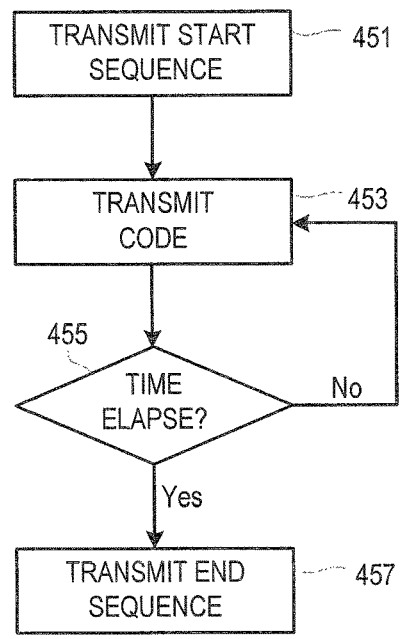
FIG. 4b is a flowchart of the method of creating a control channel of a further embodiment of the present invention.

With reference to FIGS. 4a and 4b, a predefined sequence of 'dummy' packets (i.e. a packet having no information inside) with a specific length is transmitted, 401, 451 to identify the start of the in band control channel, that is the start of communication of the dummy packets. The predefined sequence may comprise a sequence of N configurable pairs of packets, for example a pair comprising a packet having a minimum size and the other of the pair comprising a packet having a maximum length. Such initiation procedure allows the router node to put the optical node 300 into a second mode of operation, an 'OPAQUE' mode. The optical node 300 will then consider the traffic received as control plane traffic and data plane traffic will be sent again after a second sequence of dummy packets is transmitted, 405, 457 to close the OPAQUE mode and the optical node 300 returns to the first mode of operation. As mentioned above, the transponders of the optical nodes 300 are not able to read what is inside packets, but can understand their length. This allows encoding the information that need to be carried over the control channel into the length of such packets, i.e. during the OPAQUE mode the router will encode the control messages using a code, for example, a Morse coding using the 2 different lengths (a maximum length and a minimum length of the dummy packets). Other coding schemes could be utilized in which control commands are coded such that each command is defined by a predefined length of packet or a predefined length that define a portion of a control command. The use of a Morse-type code simplifies the coding schemes and resources required.

The in band control channel is terminated by another predefined sequence. After that the router node will start again to send 'real traffic' and the optical node will return to the first mode of operation.

The operation of the router node and optical node 300 will now be described in more detail with reference to FIGS. 4a to 8. When the router node needs to set up an in band control channel for communication with the optical node 300, the router node transmit, 401, 451 a predefined sequence 601 of 'dummy' packets 605_1 to 605_m with predefined lengths (hereinafter referred to as the INIT sequence). This INIT sequence 601 is set up to something not commonly present in the 'real' traffic transmission. For instance a sequence of one packet of the shortest admitted length (i.e. the minimum length) followed by one packet of the longest length (i.e. the maximum length, is repeated for, say 10 times.

The optical node 300 receives 501 and recognizes this sequence 601 of packets 605_1 to 605_m and understands that all the packets 607_1 to 607_p received after the sequence 601 will be a control-plane message 603, sent by the router node, asking some action to the transponder of the optical node (e.g. set up a loop, discovery, etc.). Hence the router node places the optical node 300 in an 'OPAQUE' mode so real traffic won't flow till the end of control channel protocol session.

The router node, after the INIT sequence 601, transmits 403, 453 the control commands to the optical node 300 using a predefined code.

Figure 7:
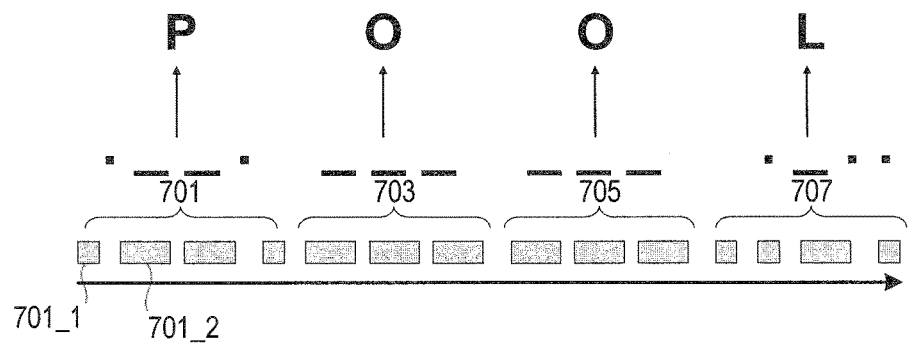
FIG. 7 is a simplified schematic illustrating one form of coding of an embodiment of the present invention.
Figure 8:
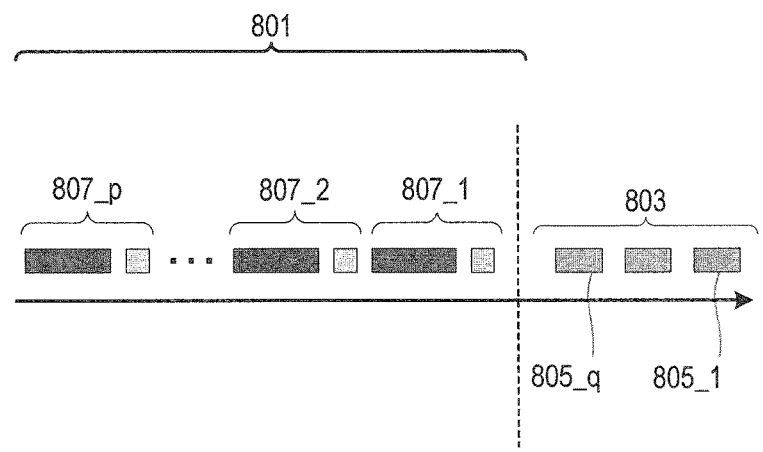
FIG. 8 is a simplified schematic of an end sequence of the control channel of an embodiment of the present invention.

This code may be similar to the Morse code, where, again, a sequence 701, 703, 705, 707 of 'dummy' packets 701_1, 701_2, with particular lengths, has a specific 'meaning' for the optical node 300. As example a dummy packet 701_1 having a minimum length (for example dimension of the Link minimum transfer unit) may be used as the dot in the Morse code and a dummy packet 701_2 having a maximum length, for example two times the min transfer unit may be used to indicate the dash in the Morse code. As illustrated in FIG. 7, it is possible to implement the control channel commands using only 16 dummy packets. A code based on two values (long and short) like, for example the Morse code, is one possible example of a code that can be used in embodiments of the present invention. It is envisaged, however, that more than two values based on length of the dummy packets can be used in alternative examples of the code for use in alternative embodiments of the present invention.

In the second mode of operation, the decoder 305 of the optical node 300 decodes 505 the control commands and passes the commands to the controller 311 for controlling the node. Upon receipt 507 of the END sequence the optical node returns 503 to the first mode of operation.

To increase the robustness of the protocol, the router node may periodically (for example every M packet) transmits 403 the INIT sequence, so that the optical node 300 understands that the in band control channel is still open, for example every M seconds. The number of seconds, M, may be configurable. At each refresh the control channel timer (not shown) is reset.

To close the control channel 803, the router node transmits 405 another predefined sequence of 'dummy' packets 807_1 to 807_p, an END sequence 801. From that moment on, the router node starts again to transmit 'real' traffic. The optical node recognizes the END sequence 803 and stops the second mode of operation of decoding the incoming lengths of packets 807_1 to 807_p. The router node places the optical node 300 into its first mode of operation, for example 'transparent' mode, so that it can send real traffic 805_1 to 805_q.

A summary of the examples of states of the protocol between points a and b are shown in FIG. 2 shown in the table below with reference to their corresponding operations.

| State (link based: every different pair of port a, b are different protocol instances) | Action |
| --- | --- |
| INIT (a→b) | First predefined sequence of a dummy packets (sequence of N configurable pairs of packets of min and max size) to inform b that a control channel; sequence is starting 20 bytes→ 64 bytes Receiver 303 at b is able to detect and count all packets of minimum size and maximum size. When receiver 303 receives N/2 MIN + N/2 MAX, the protocol transaction is started. The same control channel timer is started both on the router and the optical node. |
| ACTIVE (a→b) Control behavior coded into packets size | Each new dummy packet has a predetermined size: the sequence of size codes the control command which is the action the optical node is to take |
| REFRESH (a→b) | INIT sequence is repeated every M (configurable) seconds as a "keep alive" of the control channel |

| State (link based: every different pair of port a, b are different protocol instances) | Action |
|---|---|
| SESSION ELAPSED (b) END (a→b) | At each refresh the control channel timer is reset Control channel timer triggers the end of the control channel transaction Control channel session is closed. Optical node changes form the second mode of operation to the first mode |

Alternatively, the step of transmitting the plurality of dummy packets may be repeated periodically until transmission of the second, predefined sequence of packets. The second, predefined sequence of packets may be transmitted during a predetermined time interval, 455 as monitored by control channel timers (not shown here) on the router and the optical node.

This first protocol is totally unidirectional since the transponder of the optical node 300 is not able to answer to the data card of the router node. A second embodiment is an enhancement of the first embodiment described above in which a consequent action that the transponder of the optical node 300 does when it enters into the second mode of operation (ACTIVE state). At that point the optical node can program a local loop. This way the output interface on the router node receives a sort of acknowledgement of the activation of the optical node into its ACTIVE state.

Figure 5A:
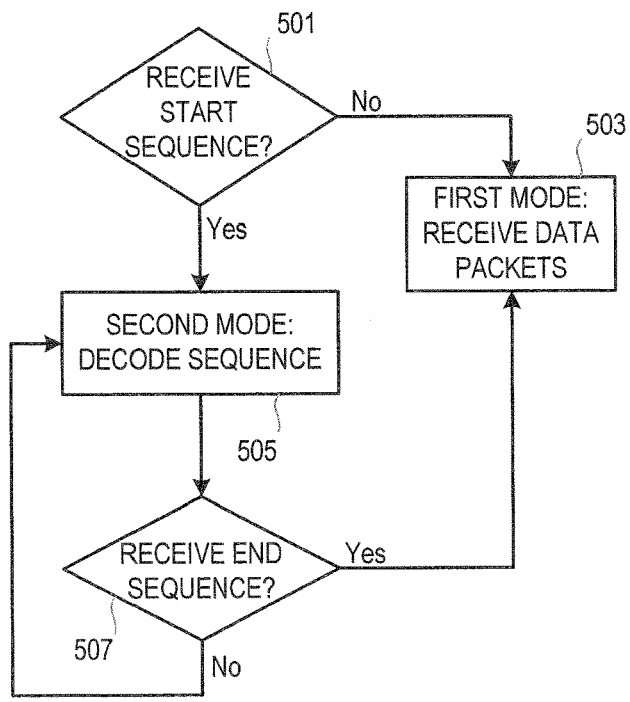
FIG. 5a is a flowchart of the method of controlling an optical node of a first embodiment of the present invention.
Figure 5B:
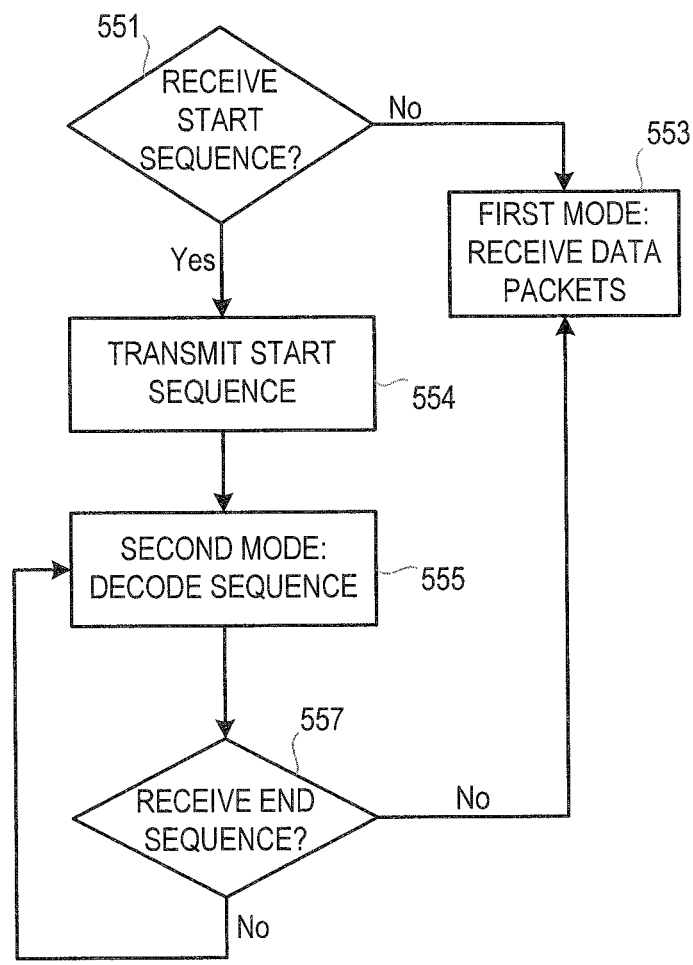
FIG. 5b is a flowchart of the method of controlling an optical node of a second embodiment of the present invention.
Figure 6:
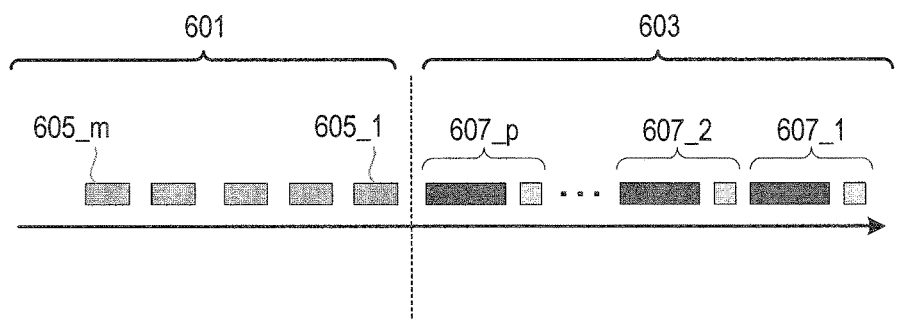
FIG. 6 is a simplified schematic of a start sequence of the control channel of an embodiment of the present invention.

The sequence of operations of the second embodiment of the present invention is illustrated in FIG. 5b and the table below:

As described above the in band channel is initiated by transmission of the INIT sequence. The optical node upon receipt of the INIT sequence, the optical node returns 554 the INIT sequence to the router node to confirm receipt and the optical node changes the mode of operation from a first mode in which real traffic is received to a second mode in which control traffic is received and processed 555 until the END sequence is received 557 and the optical node returns 553 to the first mode of operation.

| State (link based: every different pair of port a, b are different protocol instances) | Action |
|---|---|
| INIT(a→b) | First predefined sequence of a dummy packets (sequence of N configurable pairs of packets of min and max size) to inform b that a control channel; sequence is starting 20 bytes→ 64 bytes Receiver 303 at b is able to detect and count all packets of minimum size and maximum size. When receiver 303 receives N/2 MIN + N/2 MAX, the protocol transaction is started. Optical node programs a local loopback on interface b |
| INIT (b→a) | Same as above, but router receives the same INIT sequence from the optical node. State is ACTIVE and the optical node disables the local loopback on interface b The same control channel timer is started both on the router and the optical node. |
| ACTIVE (a→b) Control behavior coded into packets size | Each new dummy packet has a predetermined size: the sequence of size codes the control command which is the action the optical node is to take |
| REFRESH (a→b) | INIT sequence is repeated every M (configurable) seconds as a "keep alive" of the control channel At each refresh the control channel timer is reset |
| SESSION ELAPSED (b) END (a→b) | Control channel timer triggers the end of the control channel transaction Control channel session is closed. Optical node changes form the second mode of operation to the first mode |

The protocol of the present invention is a key enabler for packet-opto integration. It allows providing an in band control channel between two technologies with totally different characteristics. Further, the present invention provides capital expenditures (CAPEX) reduction such that there is no increase in resources for the router interface to accommodate an out of band control channel and further there is no longer a requirement to have packet switching engine/card between the router interface and the transponder. Further network operations are simplified as there is no need for management required for disjointed data and control channels. The present invention is implemented without the requirement to change hardware configuration already installed in existing networks. Actual networks where packet interface from the routers are directly connected to the transponders of the optical devices do not need any manual intervention.

Variations to the disclosed embodiments can be understood and effected by those skilled in the art in practicing the claimed invention, from a study of the drawings, the dis-

The invention claimed is:

1. A method of creating an in band control channel between nodes of a communication network, the method comprising the steps of:
   transmitting a first sequence of dummy packets, each dummy packet having one of a plurality of different predetermined lengths, the first sequence of dummy packet lengths defining a code corresponding to at least one control command.

2. A method according to claim 1, wherein the method further comprises:
   transmitting a second predefined sequence of dummy packets to define initialisation of the control channel and wherein the step of transmitting the first sequence of dummy packets succeeds transmitting the second predefined sequence of dummy packets.

3. A method according to claim 2, wherein the second predefined sequence comprises a first predetermined number of substantially equal length dummy packets.

4. A method according to claim 2, wherein the second predefined sequence comprises a first predetermined number of pairs of dummy packets, one of each pair of dummy packets comprising a dummy packet having a minimum length and the other of each pair of dummy packets comprising a dummy packet having a maximum length.

5. A method according to claim 2, wherein the method further comprises:
   upon receiving the second predefined sequence of dummy packets at a node,
      receiving the first sequence of transmitted dummy packets;
      checking the length of each received dummy packet;
      decoding at least one control command based on the sequence of lengths of the received dummy packets.

6. A method according to claim 2, wherein the method further comprises the step of:
   repeating the step of transmitting the second predefined sequence of dummy packets after the transmission of a predetermined number of dummy packets.

7. A method according to claim 6, wherein the predetermined number of dummy packets is configurable.

8. A method according to claim 2, wherein the method further comprises the step of:
   returning transmission of the second predefined sequence of dummy packets.

9. A method according to claim 1, wherein the method further comprises:
   transmitting a third, predefined sequence of packets to define the termination of the control channel and wherein the step of transmitting the first sequence of dummy packets precedes transmitting the third predefined sequence of dummy packets.

10. A method according to claim 9, wherein the third predefined sequence comprises a second predetermined number of substantially equal length dummy packets.

11. A method according to claim 9, wherein the third predefined sequence comprises a second predetermined number of pairs of dummy packets, one of each pair of dummy packets comprising a dummy packet having a minimum length and the other of each pair of dummy packets comprising a dummy packet having a maximum length.

12. A method according to claim 9, wherein the step of transmitting the first sequence of dummy packets is repeated periodically until transmission of the third, predefined sequence of packets.

13. A router node for a communication network, the router node comprising:
   a transmitter configured to:
   transmit a first sequence of dummy packets to at least one node, each dummy packet having one of a plurality of different predetermined lengths, the first sequence of dummy packet lengths defining a code corresponding to at least one control command for said at least one node.

14. A router node according to claim 13, wherein the transmitter is further configured to:
   transmit a second predefined sequence of dummy packets to define initialisation of the control channel and wherein the step of transmitting the first sequence of dummy packets succeeds transmitting the second predefined sequence of dummy packets.

15. A router node according to claim 14, wherein the router node is configured to receive, as acknowledgment that the at least one node is in the second mode of operation, the second predefined sequence of dummy packets from the at least one node.

16. A router node according to claim 13, wherein the transmitter is further configured to:
   transmit a third, predefined sequence of packets to define the end of the control channel and wherein the step of transmitting the first sequence of dummy packets precedes transmitting the third predefined sequence of dummy packets.

17. A node for a communication network, the node having two modes of operation, a first mode of operation in which the node is configured to receive data plane traffic and a second mode of operation in which the node is configured to receive control plane traffic, the node comprising:
   a receiver configured to receive data packets from a router node in the first mode of operation, and to receive a plurality of dummy packets in the second mode of operation, each dummy packet having one of a plurality of different predetermined lengths, the sequence of dummy packet lengths defining a code corresponding to at least one control command;
   a decoder configured to check the length of each received dummy packet and;
      decode at least one control command based on packet lengths of a first sequence of the received dummy packets in the second mode of operation; and
   a controller configured to control operation of the node in accordance with the at least one decoded control command.

18. A node according to claim 17, wherein the receiver is further configured to:
   receive a second predefined sequence of dummy packets to change the mode of operation from the first mode to the second mode.

19. A node according to claim 18, wherein the node is further configured to transmit the second predefined sequence of dummy packets to the router node to acknowledge that the node is in the second mode of operation.

20. A node according to claim 17, wherein the receiver is further configured to:
   receive a third, predefined sequence of packets to change the mode of operation from the second mode to the first mode.

* * * * *